United States Patent
Hinrichs et al.

(10) Patent No.: US 12,091,579 B2
(45) Date of Patent: Sep. 17, 2024

(54) UNIVERSAL SLIP AND FLOW CONTROL ADDITIVES WITH RECOATABLE QUALITY

(71) Applicant: Evonik Operations GmbH, Essen (DE)

(72) Inventors: Petra Hinrichs, Bochum (DE); Berend-Jan de Gans, Muelheim an der Ruhr (DE); Roger Reinartz, JG Best (NL)

(73) Assignee: Evonik Operations GmbH, Essen (DE)

(*) Notice: Subject to any disclaimer, the term of this patent is extended or adjusted under 35 U.S.C. 154(b) by 590 days.

(21) Appl. No.: 17/414,497

(22) PCT Filed: Dec. 13, 2019

(86) PCT No.: PCT/EP2019/085054
§ 371 (c)(1),
(2) Date: Jun. 16, 2021

(87) PCT Pub. No.: WO2020/126894
PCT Pub. Date: Jun. 25, 2020

(65) Prior Publication Data
US 2022/0073765 A1 Mar. 10, 2022

(30) Foreign Application Priority Data
Dec. 20, 2018 (EP) .................................. 18214444

(51) Int. Cl.
C09D 7/65 (2018.01)
C08G 77/46 (2006.01)
C09D 7/47 (2018.01)
C09D 175/06 (2006.01)

(52) U.S. Cl.
CPC ............. *C09D 7/65* (2018.01); *C08G 77/46* (2013.01); *C09D 7/47* (2018.01); *C09D 175/06* (2013.01)

(58) Field of Classification Search
CPC .......... C09D 7/65; C09D 7/47; C09D 175/06; C08G 77/46
See application file for complete search history.

(56) References Cited

U.S. PATENT DOCUMENTS

| | | |
|---|---|---|
| 3,984,347 A | 10/1976 | Keil |
| 4,698,178 A | 10/1987 | Hüttinger et al. |
| 4,886,551 A | 12/1989 | Fink et al. |
| 5,733,971 A | 3/1998 | Feldmann-Krane et al. |
| 5,994,415 A | 11/1999 | Grüning et al. |
| 6,194,596 B1 | 2/2001 | Josten et al. |
| 7,598,215 B2 | 10/2009 | Hinrichs et al. |
| 8,034,848 B2 | 10/2011 | Landers et al. |
| 8,247,525 B2 | 8/2012 | Schubert et al. |
| 8,268,939 B2 | 9/2012 | Ebbrecht et al. |
| 8,529,694 B2 | 9/2013 | Herschke et al. |
| 8,772,423 B2 | 7/2014 | De Gans et al. |
| 9,138,385 B2 | 9/2015 | Dahl et al. |
| 9,353,289 B2 | 5/2016 | De Gans et al. |
| 11,021,608 B2 | 6/2021 | Seyfried et al. |
| 11,254,819 B2 | 2/2022 | Hallack et al. |
| 2006/0217284 A1 | 9/2006 | Hinrichs et al. |
| 2008/0102274 A1 | 5/2008 | Herschke et al. |
| 2008/0188673 A1 | 8/2008 | Lehmann et al. |
| 2009/0012197 A1 | 1/2009 | Landers et al. |
| 2009/0053552 A1 | 2/2009 | De Gans et al. |
| 2009/0253817 A1 | 10/2009 | Gu et al. |
| 2010/0036011 A1 | 2/2010 | De Gans et al. |

(Continued)

FOREIGN PATENT DOCUMENTS

| | | |
|---|---|---|
| CN | 102015838 | 4/2011 |
| CN | 102911547 | 2/2013 |

(Continued)

OTHER PUBLICATIONS

U.S. Pat. No. 7,598,215, Oct. 6, 2009, 2006/0217284, Hinrichs et al.
U.S. Appl. No. 11/909,179, filed Sep. 20, 2007, 2008/0188673, Lehmann et al.
U.S. Pat. No. 8,529,694, Sep. 10, 2013, 2008/0102274, Herschke et al.
U.S. Pat. No. 8,034,848, Oct. 11, 2011, 2009/0012197, Landers et al.
U.S. Appl. No. 12/196,404, filed Aug. 22, 2008, 2009/0053552, De Gans et al.
U.S. Appl. No. 12/364,283, filed Feb. 2, 2009, 2010/0036011, De Gans et al.

(Continued)

*Primary Examiner* — Ling Siu Choi
*Assistant Examiner* — Olga Lucia Donahue
(74) *Attorney, Agent, or Firm* — Grüneberg and Myers PLLC

(57) ABSTRACT

A universal slip and levelling additive having a recoatable or reprintable property contains polyoxyalkylene-polysiloxane copolymers of general formula (I)

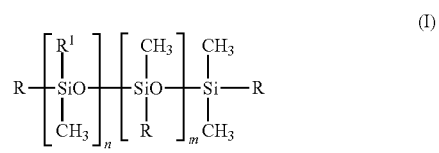

wherein $R^1$=identical and/or different alkyl radicals having 1 to 8 carbon atoms, preferably having 1-4 carbon atoms, particularly preferably having 1 or 2 carbon atoms; $R=R^1$ and/or $-C_pH_{2p}O[(C_2H_4O)_x(C_3H_6O)_y]R^2$, where p=2, 3 or 4, with the proviso that at least one $R=-C_pH_pO[(C_2H_4O)_x(C_3H_6O)_y]-$; $R^2$=alkyl radical having 1 to 3 carbon atoms; n≥45; m=1 to 5; and wherein x and y are selected such that the molecular weight of the polyoxyalkylene block $[(C_2H_4O)_x(C_3H_6O)]$ is >3000 g/mol and the molar weight ratio of x to y is <0.8.

18 Claims, 1 Drawing Sheet

(56) References Cited

U.S. PATENT DOCUMENTS

| | | |
|---|---|---|
| 2010/0184913 A1 | 7/2010 | Ebbrecht et al. |
| 2011/0281973 A1 | 11/2011 | Schubert et al. |
| 2012/0071564 A1 | 3/2012 | De Gans et al. |
| 2014/0134125 A1 | 5/2014 | Dahl et al. |
| 2015/0073069 A1 | 3/2015 | De Gans et al. |
| 2019/0241741 A1 | 8/2019 | Seyfried et al. |
| 2020/0308406 A1 | 10/2020 | Seyfried et al. |
| 2021/0122921 A1 | 4/2021 | Hallack et al. |
| 2021/0253896 A1 | 8/2021 | Reinartz et al. |
| 2022/0049362 A1 | 2/2022 | Hallack et al. |
| 2022/0177652 A1 | 6/2022 | De Gans et al. |

FOREIGN PATENT DOCUMENTS

| | | |
|---|---|---|
| CN | 108047452 | 5/2018 |
| DE | 10 2010 031 094 | 1/2012 |
| EP | 0 265 807 A3 | 4/1988 |
| EP | 0 265 807 A2 | 5/1988 |
| EP | 1 035 153 A2 | 9/2000 |
| EP | 1 035 153 A3 | 9/2000 |
| EP | 2198932 | 6/2010 |
| EP | 4011992 | 6/2022 |
| EP | 4015592 | 6/2022 |
| WO | 2009123910 | 10/2009 |
| WO | 2010/046181 | 4/2010 |

OTHER PUBLICATIONS

U.S. Pat. No. 8,772,423, Jul. 8, 2014, 2012/0071564, De Gans et al.
U.S. Pat. No. 8,268,939, Sep. 18, 2012, 2010/0184913, Ebbrecht et al.
U.S. Pat. No. 8,247,525, Aug. 21, 2012, 2011/0281973, Schubert et al.
U.S. Pat. No. 9,138,385, Sep. 22, 2015, 2014/0134125, Dahl et al.
U.S. Pat. No. 9,353,289, May 31, 2016, 2015/0073069, De Gans et al.
U.S. Pat. No. 11,201,608, Jun. 1, 2021, 2019/0241741, Seyfried et al.
U.S. Appl. No. 16/834,781, filed Mar. 30, 2020, 2020/0308406, Seyfried et al.
U.S. Appl. No. 17/172,348, filed Feb. 10, 2021, 2021/0253896, Reinartz et al.
U.S. Pat. No. 11,254,819, Feb. 22, 2022, 2021/0122921, Hallack et al.
U.S. Appl. No. 17/399,171, filed Aug. 11, 2021, 2022/0049362, Hallack et al.
Extended European Search Report issued Jul. 4, 2019 in European Application No. 18214444.4.
International Search Report issued Mar. 27, 2020 in PCT/EP2019/085054 with translation, 6 pages.
Written Opinion issued Mar. 27, 2020 in PCT/EP2019/085054 with translation, 9 pages.

Measurements of slip characteristics
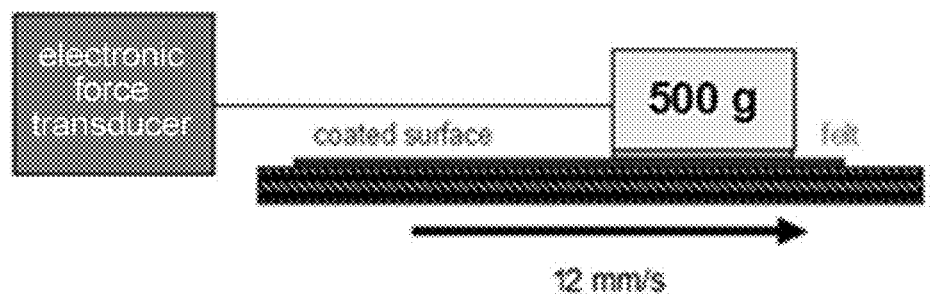

UNIVERSAL SLIP AND FLOW CONTROL ADDITIVES WITH RECOATABLE QUALITY

CROSS-REFERENCE TO RELATED APPLICATIONS

This application is the National Stage entry under § 371 of International Application No. PCT/EP2019/085054, filed on Dec. 13, 2019, and which claims the benefit of European Application No. 18214444.4, filed on Dec. 20, 2018. The content of each of these applications is hereby incorporated by reference in its entirety.

BACKGROUND OF THE INVENTION

Field of the Invention

The present invention relates to universal slip and leveling additives based on polyoxyalkylene-polysiloxane copolymers.

Description of Related Art

The demands on paints and coatings are diverse. In principle, paints or coatings have two tasks or functions, the protective and the decorative function. If only the term "coating" is stated below, both types of coating are intended. They decorate, protect and preserve materials such as wood, metal or plastic. Accordingly, on the one hand bright and glossy paint layers are required and on the other hand a sealed coating layer for ensuring chemical and mechanical resistance, a certain surface slip of the coatings or a particular haptic property.

Coated products such as for example a piece of furniture, a refrigerator or a car can be sold more readily when the coating has a good flow and levelling profile. For this reason, slip and leveling additives have been developed for optimizing the flow behaviour of a coating layer and these are used in paint and coating formulations.

Commercially available slip and levelling additives are known based on polyacrylates, cellulose acetobutyrates, fluorosurfactants or silicones.

Silicones have been used in the paint industry since the beginning of the 1950s. Particularly by means of the chemical modification of the dimethylpolysiloxane chain, the most important silicone properties, such as compatibility, slip resistance or scratch resistance, could be controlled.

Known modified dimethylpolysiloxane chains are polyoxyalkylene-polysiloxane block copolymers, in which the weighed ratio of the polyoxyalkylene blocks and the polysiloxane blocks of the block copolymers and also the assembly of the two blocks are of great importance. For the construction of a maximally effective slip and levelling additive for use in wood, plastic, industrial and automotive coatings or printing inks, there are a multiplicity of variables both for the polyoxyalkylene block and for the polysiloxane block.

The polyoxyalkylene block may be composed of various oxyalkylene units, especially of oxyethylene, oxypropylene and oxybutylene units. The weight ratio of these units to one another, the sequence thereof and the molar weight of the polyoxyalkylene block may be varied. Also of importance is the end group of the polyoxyalkylene block which may be reactive (for example OH group) or inert (for example alkoxy group). The polyoxyalkylene block may be bonded to the polysiloxane block by a hydrolytically stable C—Si bond or the hydrolytically less stable C—O—Si bond. Different polyoxyalkylene blocks may also be bonded to the polysiloxane block. The polysiloxane block may be varied in respect of the nature and proportion of the Si units. The siloxane block may be linear or branched and have differing molecular weights. The polyoxyalkylene blocks may be bonded to the polysiloxane block terminally and/or laterally. Predictions about the effectiveness of a polysiloxane-polyoxyalkylene block copolymer as a slip and levelling additive are possible only to a limited extent. Those skilled in the art are therefore compelled to investigate possible variations largely by empirical means. Considering the virtually incalculably large number of possible variations, finding specific structural parameters and corresponding block copolymers that are particularly effective in the context of producing slip and levelling additives is a progressive and therefore inventive achievement.

Polysiloxane-polyoxyalkylene block copolymers used in coatings technology have already been described repeatedly. From the large number of corresponding publications the following documents are cited as representative examples.

For instance. EP 0 285 807 A2 describes the use of polyoxyalkylene-polysiloxane block copolymers as agents for improving the scratch resistance and increasing the surface slip of coating surfaces, in which the chain length of the block copolymers is 40 to 60 and the average molecular weight of the polyoxyalkylene blocks is between 1400 to 3000 g/mol.

EP 0 785 240 B1 also discloses aqueous and radiation-curing printing varnishes and printing inks comprising specific polyoxyalkylene-polysiloxane copolymers having an improved scratch resistance, an increased surface slip and also an exceptionally low tendency to form such that production of the printing ink proceeds without any problem and at the same time an optically appealing print image can be obtained. Here, the chain length or the copolymers is likewise 40 to 60, in which the average molecular weight of the polyoxyalkylene blocks is 300 to 800 g/mol.

However, both polyoxyalkylene-polysiloxane copolymers mentioned in the prior art have the disadvantage that they are not recoatable or reprintable in varnishes and paints or have poor values.

The recoatability or reprintability of coatings or paints is of particular importance for repair and maintenance of coating and paint surfaces. The occurrence of surface damage of coatings on articles is known in all sectors and repair of these damaged areas always represents a challenge. Also applying an overprint varnish on diverse printed materials, such as foils and paper, represents a major need. In this case, the recoatable layer should form a unit with the newly applied layer and not detach from each other.

SUMMARY OF THE INVENTION

The object of the invention, therefore, is to provide slip and levelling additives having improved scratch resistance, increased surface slip analogous to those from the prior art, but universally applicable and in this case having at the same time recoatability and reprintability, without impairing the optical varnish/paint finish by insufficient wetting or the like.

Moreover, a deliberate targeted limitation of the range described can result in application-optimized products which to date have not been found in abundance in the known ranges.

To achieve the object, therefore, proposed are universal slip and levelling additives having recoatable or reprintable property, comprising polyoxyalkylene-polysiloxane copolymers of general formula (I)

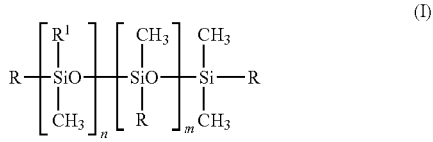

R¹=Identical and/or different alkyl radicals having 1 to 8 carbon atoms, preferably having 1-4 carbon atoms, particularly preferably having 1 or 2 carbon atoms, R=R¹ and/or $-C_pH_{2p}O[(C_2H_4O)_x(C_3H_6O)_y]R^2$, where p=2, 3 or 4, with the proviso that at least one $R=-C_pH_{2p}O[(C_2H_4O)_x(C_3H_6O)_y]-$, R²=alkyl radical having 1 to 3 carbon atoms, n≥45, preferably n≥50, particularly preferably n>60, m=1 to 5.

wherein x and y are selected such that the average molecular weight of the polyoxyalkylene block $-[(C_2H_4O)_x(C_3H_6O)_y]-$ is >3000 g/mol and the molar weight ratio of x to y is <0.8, preferably <0.75.

Preferably with the proviso that n is not greater than 500, preferably not greater than 300 and particularly preferably not greater than 200.

Preferably with the proviso that the average molecular weight of the polyoxyalkylene block $-[(C_2H_4O)_x(C_3H_6O)_y]-$ is less than 10 000 g/mol, preferably less than 8 000 g/mol and particularly preferably less than 5 000 g/mol.

Preferably with the proviso that the molar weight ratio of x to y is not less than 0.05, preferably not less than 0.1 and particularly preferably not less than 0.2.

BRIEF DESCRIPTION OF THE DRAWING

The FIGURE shows a schematic representation of the test method.

DETAILED DESCRIPTION OF THE INVENTION

It is evident to a person skilled in the art that the copolymers obtained are in the form of a mixture, the distribution of which is substantially determined by statistics. The values for x, y, p and n, m therefore correspond to average values.

Of essential significance for the properties of the polyoxyalkylene-polysiloxane copolymers are the numerical values of the indices n and m. n specifies the number of methylalkylsiloxy units and determines the chain length of the copolymers. In the polyoxyalkylene-polysiloxane copolymers to be used in accordance with the invention, n has numerical values of n≥45, preferably n≥50, particularly preferably n>60. Preferably with the proviso that n is not greater than 500, preferably not greater than 300 and particularly preferably not greater than 200. It is a familiar concept to a person skilled in the art that the compounds are in the form of a mixture having a distribution which is governed substantially by statistics. The value of n is therefore the average value of the number of methylalkylsiloxy units.

The polysiloxanes used in accordance with the invention are generally prepared by a platinum-catalyzed addition reaction of a siloxane comprising a silane hydrogen atom with a linear polyoxyalkylene oxide polyether, wherein the linear chain is blocked at one end by an alkyleneoxy group (such as allyloxy or vinyloxy) and has been capped, for example, with an alkoxy, aralkyloxy or acyloxy group at the other end, as in accordance with the following equation:

$$XSiH + H_2C=CHCH_2OR^3 \rightarrow XSiCH_2CH_2CH_2OR^3$$

The polysiloxanes according to the invention are known in principle. Further preparation processes are disclosed in EP 0 785 240 B1.

In accordance with the invention, the polyoxyalkylene blocks consist of oxyethylene and oxypropylene units, preferably starting from ethylene oxides and propylene oxides, wherein the average molecular weight of the polyoxyalkylene blocks is >3000 g/mol. The molar weight ratio of the oxyethylene units to the oxypropylene units, expressed by the ratio x:y, is <0.8, preferably <0.75.

Surprisingly, it has now been found that (I) polysiloxanes, having a chain length of n≥45, preferably n≥50, particularly preferably n>60, (ii) a specifically selected average molecular weight of the polyoxyalkylene block $[(C_2H_4O)_x(C_3H_6O)_y]$ of >3000 g/mol, (iii) a specifically selected molar weight ratio of oxyethylene to oxypropylene units x to y is <0.8, preferably <0.75 and (iv) with the use of so-called endcapped polyalkylene oxide-polyethers are capable of producing slip and levelling additives with excellent typical properties of surface slip and scratch resistance and are also recoatable.

The boundary condition formulated in (Iv) does not exclude residual amounts of uncapped polyethers (i.e. R² is hydrogen) as a result of the preparation which may be present in certain cases in a proportion of up to 10% in endcapped polyethers.

The slip and levelling additives according to the invention meet more than two important performance properties. They improve the levelling and the slip effect and at the same time they also enable recoatability and reprintability of the coatings and printing inks.

The polyoxyalkylene-polysiloxane copolymers in the slip and levelling additives according to the invention preferably comprise the radical R²=methyl radicals.

The polyoxyalkylene-polysiloxane copolymers particularly preferably comprise exclusively pendant modifications where $R=-C_pH_{2p}O[(C_2H_4O)_x(C_3H_6O)_y]R^2$, where p=2, 3 or 4.

The pendant-modified polyoxyalkylene-polysiloxane copolymers according to the invention preferably comprise α- and ω-terminal modification of alkyl radicals.

A further aspect of the invention is the use of the slip and levelling additives in coating compositions, wherein the coating compositions are solvent-containing, solvent-free or water-based paints, or printing ink.

It is possible to use polyoxyalkylene-polysiloxane copolymers preferably in amounts from 0.001 to 5.0% by weight, preferably 0.01-3.0% by weight, based on the coating compositions.

The invention further provides for the use of polyoxyalkylene-polysiloxane copolymers of general formula (I)

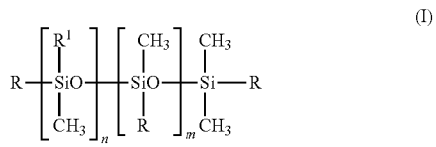

$R^1$=Identical and/or different alkyl radicals having 1 to 8 carbon atoms, preferably having 1-4 carbon atoms, particularly preferably having 1 or 2 carbon atoms, $R=R^1$ and/or —$C_pH_{2p}O[(C_2H_4O)_x(C_3H_6O)_y]R^2$, where p=2, 3 or 4, with the proviso that at least one $R=-C_pH_{2p}O[(C_2H_4O)_x(C_3H_6O)_y]$—, $R^2$=alkyl radical having 1 to 3 carbon atoms, n≥45, preferably n≥50, particularly preferably n>60, m=1 to 5, wherein x and y are selected such that the molar weight of the polyoxyalkylene block —$[(C_2H_4O)_x(C_3H_6O)_y]$— is >3000 g/mol and the molar weight ratio of x to y is <0.8, preferably <0.75, as universal slip and levelling additives having recoatable and reprintable property.

Preference is given to the use of polyoxyalkylene-polysiloxane copolymers of the general formula (I), preferably with the proviso that n is not greater than 500, particularly preferably not greater than 300 and very particularly preferably not greater than 200.

Preference is given to the use of polyoxyalkylene-polysiloxane copolymers of the general formula (I), preferably with the proviso that the average molecular weight of the polyoxyalkylene block —$[(C_2H_4O)_x(C_3H_6O)_y]$— is less than 10 000 g/mol, preferably less than 8000 g/mol and particularly preferably less than 5000 g/mol.

Preference is given to the use of polyoxyalkylene-polysiloxane copolymers of the general formula (I), preferably with the proviso that the molar weight ratio x to y is not less than 0.05, preferably not less than 0.1 and particularly preferably not less than 0.2.

With regards to the specific conditions chosen for the polyoxyalkylene-polysiloxane copolymers, reference is made to the aforementioned detail.

Preference is given to using the polyoxyalkylene-polysiloxane copolymers having exclusively pendant modifications where $R=-C_pH_{2p}O[(C_2H_4O)_x(C_3H_6O)_y]R^2$, where p=2, 3 or 4.

Particular preference is given to using the pendant-modified polyoxyalkylene-polysiloxane copolymers according to the invention having α- and ω-terminal modifications of alkyl radicals.

The polyoxyalkylene-polysiloxane copolymers are preferably used for producing coating compositions.

Preferably, 0.001 to 5.0% by weight, preferably 0.01-3.0% by weight polyoxyalkylene-polysiloxane copolymers, based on the coating composition, are used.

The examples which follow are provided merely to elucidate this invention to those skilled in the art and do not constitute any limitation of the subject matter of the invention or of the described process whatsoever.

Measurement Methods:

Parameters or measurements are preferably determined using the methods described herein below. In particular, these methods were used in the examples of the present intellectual property right.

Slip Resistance Value G (cN)

To measure the surface slip a test method has proven of value in which the friction force is measured. The method is carried out by means of a Bluehill instrument from Instron.

The FIGURE shows a schematic representation of the test method.

A 500 g weight with defined felt underlay is drawn uniformly across the coating surface by a tensile tester. The force required for this purpose is measured with an electronic force transducer. The test is carried out at a constant speed of 12 mm/sec and enables a reproducible measurement with high precision. The lower the slip resistance value G (cN), the higher the surface slip of the coating surface.

Scratch Resistance

The mechanical resistance of a coating surface to visible damage by a moving hard object touching the surface is known as scratch resistance. The object used here is the finger nail. With the upper surface of the finger nail at an angle of 45° the coating surface is scratched 5 times under reasonable pressure, wherein the direction of scratch is away from the assessor. To assess the scratch value, a standard sample and samples to be tested are subjected to the same assessor. Subsequently, damage to the coating surface is visually assessed. For this purpose, the standard sample is compared with the sample to be tested.

The assessment employs the following scale:

0=corresponds to the standard sample (without additive)

−=worse than standard sample

+=better than standard sample

Application

The respective coating compositions are applied on wood panels using a 120 μm 4-sided film applicator. The wood panels thus coated are dried for 2 hours at room temperature (RT), 2 hours at 40° C. and then a further 24 hours at RT. Subsequently, a second coating is applied to the dried first coating from the previous day in analogy to that described above. The wood panels with two coating layers are dried for 2 hours at room temperature, 2 hours at 40° C. and then a further 7 days at RT (applied wood plate).

Adhesion is assessed by cross-cut/tear off of adhesive tape. A good adhesion value is GT=0. A poor value is GT=5.

Recoatability

The recoatability is determined via the adhesion values by means of cross-cut in accordance with DIN EN ISO 2409. For this purpose, the adhesion of two coatings applied to each other is determined.

Haptic Property and Touch

The haptic property is the subjective perception of the surface nature of a coating. For this purpose, the fingertips are stroked uniformly across the coated wood panels. Since this is a subjective test, the test is always carried out by the same assessor and compared with one another. For this purpose, a standard sample is used as direct comparison.

The assessment employs the following 3-level scale:

0=corresponds to the standard sample (without additive)

−=worse than standard sample

+=better than standard sample

Working Examples:

1. Slip and Levelling Additives Based on Polyoxyalkylene-Polysiloxane Copolymers Table 1 shows inventive examples 1-3 and comparative examples (CE) 4-12.

As comparative examples CE 4-8, the block copolymers according to EP 0 285 807 A2 or EP 0 785 240 B1 and CE 9-11 according to CN 108047452 were produced and used for the performance test.

In addition, commercially available levelling additives were used as further comparative examples CE 7 (Tego® Glide 410, Evonik) and CE 8 (Borchi® Gol OL 17, Borchers) for the performance test.

These comprise polyether-modified polysiloxanes according to product data sheets.

Preparation of the Inventive Slip and Levelling Additives 1-3

The siloxanes, polyethers are initially charged in a flask provided with stirrer, thermometer, gas inlet and reflux condenser (see Table 1). Nitrogen is passed through the apparatus and the flask contents are heated to 80-100° C.

while stirring. At this temperature, a platinum catalyst (ca. 2 to 4 ppm) is added to the mixture. An exothermic reaction sets in. In this case, depending on the reactants used, temperature increases of 10 to 30° C. occur. The mixtures are left to react and Si—H conversions of ≥97% are achieved (determined by hydrogen releasable with n-butanol in an alkaline medium). During the reaction, the initially turbid flask contents becomes clear. Reaction times are generally 1 to 8 hours.

The polyethers are preferably used in excess (30 to 60%). The reaction described above can also be carried out using solvents which is then particularly advantageous if high-viscosity products are formed. In this case, solvents can be used which can be distilled off after the reaction (e.g. toluene, xylene) or those which can remain in the end product after the reaction (e.g. dipropylene glycol, di- and tripropylene glycol mono-n-butyl ether, propylene glycol monophenyl ether, double bond-free polyethers).

TABLE 2

Solvent-containing wood coating-formulation 1

| Stock coating | Weight [g] |
|---|---|
| Polyester polyol (75%) [1] | 65.5 |
| Xylene | 21.8 |
| Methoxypropyl acetate | 12.7 |
|  | 100.0 |
| Hardener |  |
| Aliphatic isocyanate (75%) [2] | 11.5 |

| Slip and levelling additive | Reference | | Position of modification of $-C_pH_{2p}O[C_2H_4O)_x(C_3H_6O)_y]R^2$ | R |
|---|---|---|---|---|
| 1 | | inventive | pendant | $-C_pH_{2p}O[(C_2H_4O)_x(C_3H_6O)_y]R^2$, $CH_3$ |
| 2 | | inventive | pendant | $-C_pH_{2p}O[(C_2H_4O)_x(C_3H_6O)_y]R^2$, $CH_3$ |
| 3 | | inventive | pendant and terminal | $-C_pH_{2p}O[(C_2H_4O)_x(C_3H_6O)_y]R^2$ |
| CE 4 | EP 0 265 807 A2 | non-inventive | pendant and terminal | $-C_pH_{2p}O[(C_2H_4O)_x(C_3H_6O)_y]R^2$ |
| CE 5 | EP 0 785 240 B1 | non-inventive | terminal | $-C_pH_{2p}O[(C_2H_4O)_x(C_3H_6O)_y]R^2$, $CH_3$ |
| CE 6 | EP 0 785 240 B1 | non-inventive | terminal | $-C_pH_{2p}O[(C_2H_4O)_x(C_3H_6O)_y]R^2$, $CH_3$ |
| CE 7 | Tego ® Glide 410 | non-inventive | | — |
| CE 8 | Borchi ® G0l OL 17 | non-inventive | | — |
| CE 9 | CN 108047452 | non-inventive | pendant | $-C_pH_{2p}O[(C_2H_4O)_x(C_3H_6O)_y]R^2$, $CH_3$ |
| CE 10 | CN 108047452 | non-inventive | pendant | $-C_pH_{2p}O[(C_2H_4O)_x(C_3H_6O)_y]R^2$, $CH_3$ |
| CE 11 | CN 108047452 | non-inventive | pendant | $-C_pH_{2p}O[(C_2H_4O)_x(C_3H_6O)_y]R^2$, $CH_3$ |

| Slip and levelling additive | $R^1$ | $R^2$ | p | n | m | x/y | Molar weight Polvos vall tem block | Appearance |
|---|---|---|---|---|---|---|---|---|
| 1 | $CH_3$ | $CH_3$ | 3 | 72 | 3.9 | 0.73 | >3000 | clear |
| 2 | $CH_3$ | $CH_3$ | 3 | 47 | 2 | 0.73 | >3000 | clear |
| 3 | $CH_3$ | $CH_3$ | 3 | 58 | 1 | 0.73 | >3000 | clear |
| CE 4 | $CH_3$ | H | 3 | 60 | 0.3 | 1.35 | 1400-3000 | clear |
| CE 5 | $CH_3$ | $CH_3$ | 3 | 48 | 1 | 2.85 | <800 | clear |
| CE 6 | $CH_3$ | $CH_3$ | 3 | 39 | 1 | 2.85 | <800 | clear |
| CE 7 | — | — | — | — | — | — | — | clear |
| CE 8 | — | — | — | — | — | — | — | clear |
| CE 9 | $CH_3$ | $CH_3$ | 3 | 72 | 3.9 | 2.03 | 3300 | cloudy, brownish |
| CE 10 | $CH_3$ | $CH_3$ | 3 | 98 | 1 | 1.56 | 1100 | cloudy, grey brown, dark sediment |
| CE 11 | $CH_3$ | $CH_3$ | 3 | 98 | 1 | 0.67 | 600 | cloudy, greyish, dark sediment |

2. Performance Testing 2.1 Solvent-Containing Wood Coating 1

A stock coating without hardener is firstly prepared according to Table 2. For this purpose, the constituents are mixed with a Dispermat for 10 minutes at 1000 rpm.

For the performance test, 0.35 g of an additive according to Table 1 are added to 50 g of stock coating and homogenized for 1 minute at 500 rpm using a Dispermat (additized stock coating).

2.9 g of hardener are weighed and re-homogenized with 25 g or additized stock coating for 1 minute at 500 rpm using a Dispermat. The wood coating 1 thus prepared is applied to a wood panel which is used for the performance test.

TABLE 3

Results for solvent-containing wood coating 1

| Solvent containing wood coating 1 (SW) | Slip and levelling additives | Re-coatability | Slip resistance values [cN] | Haptic property/touch | Scratch resistance |
|---|---|---|---|---|---|
| Standard sample (without additive) | 0 | GT 0 | 336 | 0 | 0 |
| SW 11 | 1 | GT 1 | 65 | ± | 0 |
| SW 12 | 2 | GT 1 | 60 | ± | 0 |
| SW 13 | 3 | GT 1 | 62 | ± | 0 |
| SW CE 14 | CE 4 | GT 5 | 46 | ± | 0 |

TABLE 3-continued

Results for solvent-containing wood coating 1

| Solvent containing wood coating 1 (SW) | Slip and levelling additives | Re-coatability | Slip resistance values [cN] | Haptic property/touch | Scratch resistance |
|---|---|---|---|---|---|
| SW CE 15 | CE 5 | GT 5 | 167 | 0 | 0 |
| SW CE 16 | CE 6 | GT 5 | 183 | 0 | 0 |
| SW CE 17 | Tego ® Glide 410 | GT 5 | 43 | ± | 0 |
| SW CE 18 | Borchi ® Gol OL 17 | GT 1 | 66 | 0 | 0 |
| SW CE 19 | CE 9 | GT 5 | 66 | ± | 0 |
| SW CE 110 | CE 10 | GT 5 | 61 | – | 0 |
| SW CE 111 | CE 11 | GT 5 | 49 | ± | 0 |

Table 3 shows that the slip and levelling additives according to the invention in this coating system have comparable good to better surface slip and scratch resistance. In addition, it has been established that the additized coatings have recoatability and good haptic properties. The commercial additive from Borcher likewise has a recoatable property but without good haptic properties/touch.

[1] commercially available under the name Setal® D RD 181 X, Allnex
[2] commercially available under the name Desmodur® 75 N MPA/X, Covestro 2.2 Solvent-Containing Wood Coating 2

A stock coating without hardener is firstly prepared according to Table 4. For this purpose, the constituents are mixed with a Dispermat for 10 minutes at 1000 rpm.

For the performance test, 0.35 g of an additive according to Table 1 are added to 50 g of stock coating and homogenized for 1 minute at 500 rpm using a Dispermat (additized stock coating).

13.1 g of hardener are weighed and re-homogenized with 25 g of additized stock paint for 1 minute at 500 rpm using a Dispermat. The wood coating 2 thus prepared is applied to a wood panel which is used for the performance test.

TABLE 4

Solvent-containing wood coating-formulation 2

| Stock coating | Weight [g] |
|---|---|
| Polyester polyol (75%) [3] | 71.5 |
| Methoxypropyl acetate | 5.3 |
| Butyl acetate | 17.9 |
| Ethyl acetate | 5.3 |
| | 100 |
| Hardener | |
| Aromatic isocyanate (51%) [4] | 51.4 |
| Aromatic isocyanate (75%) [5] | 34.2 |
| Butyl acetate | 14.4 |
| | 100 |

TABLE 5

Results for solvent-containing wood coating 2

| Solvent-containing wood coating 2 (SW) | Slip and levelling additives | Re-coatability | Slip resistance values [cN] | Haptic property touch | Scratch resistance |
|---|---|---|---|---|---|
| Standard sample (without additive) | 0 | GT 0 | 182 | 0 | 0 |
| SW 21 | 1 | GT 0 | 47 | ± | ± |

TABLE 5-continued

Results for solvent-containing wood coating 2

| Solvent-containing wood coating 2 (SW) | Slip and levelling additives | Re-coatability | Slip resistance values [cN] | Haptic property touch | Scratch resistance |
|---|---|---|---|---|---|
| SW 22 | 2 | GT 0 | 46 | ± | ± |
| SW 23 | 3 | GT 0 | 50 | ± | ± |
| SW CE 24 | CE 4 | GT 5 | 48 | ± | ± |
| SW CE 25 | CE 5 | GT 5 | 119 | 0 | – |
| SW CE 26 | CE 6 | GT 5 | 124 | 0 | – |
| SW CE 27 | Tego ®-Glide 410 | GT 5 | 45 | ± | ± |
| SW CE 28 | Borchi ® Gol OL 17 | GT 5 | 48 | ± | ± |
| SW CE 29 | CE 9 | GT 3 | 61 | ± | ± |
| SW CE 210 | CE 10 | GT 5 | 43 | ± | – |
| SW CE 211 | CE 11 | GT 5 | 58 | ± | ± |

Table 5 shows that the inventive slip and levelling additives in this wood coating system also have excellent recoatability. They also improve the surface slip, scratch resistance and haptic ("surface feel") properties/touch. All comparative examples have no recoatable property.

[3] commercially available under the name Desmophen® 1300 BA, Covestro
[4] commercially available under the name Desmodur® IL 1351, Covestro
[5] commercially available under the name Desmodur® L 75, Covestro

The invention claimed is:

1. A universal slip and levelling additive having a recoatable or reprintable property, comprising a polyoxyalkylene-polysiloxane copolymer of general formula (I)

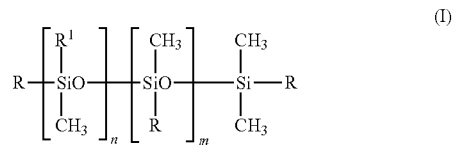

wherein
$R^1$ = identical and/or different alkyl radicals having 1 to 8 carbon atoms,
$R = R^1$ and/or $-C_pH_{2p}O[(C_2H_4O)_x(C_3H_6O)_y]R^2$, where p=2, 3 or 4, with the proviso that at least one $R = -C_pH_{2p}O[(C_2H_4O)_x(C_3H_6O)_y]R^2$,
$R^2$ = alkyl radical having 1 to 3 carbon atoms,
$n \geq 45$,
m=1 to 5, and
wherein x and y are selected such that an average molecular weight of the polyoxyalkylene block $-[(C_2H_4O)_x(C_3H_6O)_y]-$ is >3000 g/mol and a molar weight ratio of x to y is <0.75.

2. The slip and levelling additive according to claim 1, wherein the radical $R^2$ is a methyl radical.

3. The slip and levelling additive according to claim 1, wherein in the general formula (I), $R^1$ is an alkyl radical having 1 or 2 carbon atoms.

4. The slip and levelling additive according to claim 1, wherein in the general formula (I), $n \geq 60$.

5. The slip and levelling additive according to claim 1, wherein n is between 45 and 200, the average molecular weight of the polyoxyalkylene block $-[(C_2H_4O)_x(C_3H_6O)_y]-$ is greater than 3000 g/mol and less than 5,000 g/mol, and the molar weight ratio of x to y is 0.2 to 0.75.

6. The slip and levelling additive according to claim 5, wherein the radicals $R^1$ and $R^2$ are methyl radicals.

7. The slip and levelling additive according to claim 5, wherein n is is 47 to 72, m is 1 to 3.9, and the weight ratio of x to y is 0.73.

8. The slip and levelling additive according to claim 1, wherein n is between 45 and 500, the average molecular weight of the polyoxyalkylene block —[$(C_2H_4O)_x(C_3H_6O)_y$]— is greater than 3000 g/mol and less than 10,000 g/mol, and the molar weight ratio of x to y is 0.05 to 0.75.

9. A method of producing a coating composition, the method comprising:
mixing the slip and levelling additive according to claim 1 into a coating composition,
wherein the coating composition is a solvent-containing, solvent-free or water-based coating, or a printing ink.

10. The method according to claim 9, wherein the polyoxyalkylene-polysiloxane copolymer is used in an amount from 0.001 to 5.0% by weight, based on the composition.

11. The method according to claim 10, wherein the polyoxyalkylene-polysiloxane copolymer is used in an amount from 0.01-3.0% by weight, based on the composition.

12. A coating composition, comprising a universal slip and levelling additive having a recoatable or reprintable property,
wherein the slip and levelling additive comprises a polyoxyalkylene-polysiloxane copolymer of general formula (I)

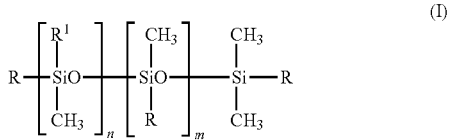

(I)

wherein
$R^1$=identical and/or different alkyl radicals having 1 to 8 carbon atoms,
$R=R^1$ and/or —$C_pH_{2p}O[(C_2H_4O)_x(C_3H_6O)_y]R^2$, where p=2, 3 or 4, with the proviso that at least one R=—$C_pH_{2p}O[(C_2H_4O)_x(C_3H_6O)_y]R^2$,
$R^2$=alkyl radical having 1 to 3 carbon atoms,
n≥45,
m=1 to 5, and
wherein x and y are selected such that a molecular weight of the polyoxyalkylene block —[$(C_2H_4O)_x(C_3H_6O)_y$]— is >3000 g/mol and a molar weight ratio of x to y is <0.75.

13. The coating composition according to claim 12, wherein the polyoxyalkylene-polysiloxane copolymer is used in an amount from 0.001 to 5.0% by weight, based on the coating composition.

14. The coating composition according to claim 13, wherein the polyoxyalkylene-polysiloxane copolymer is used in an amount from 0.01-3.0% by weight, based on the coating composition.

15. The coating composition according to claim 12, wherein in the general formula (I), $R^1$ is an alkyl radical having 1 or 2 carbon atoms.

16. The coating composition according to claim 12, wherein in the general formula (I), n≥60.

17. The coating composition according to claim 12, wherein in the general formula (I), x and y are selected such that the molar weight ratio of x to y is <0.75.

18. The coating composition according to claim 12, wherein the coating composition is a solvent-containing, solvent-free or water-based coating, or a printing ink.

* * * * *